(12) United States Patent
Lai

(10) Patent No.: US 6,517,117 B1
(45) Date of Patent: Feb. 11, 2003

(54) THROUGH WALL CONNECTOR FOR A RESERVOIR

(76) Inventor: Han-Chin Lai, No. 238, Sec. 1, Shenlin Rd., Taya Hsiang, Taichung Hsien (TW)

(*) Notice: Subject to any disclaimer, the term of this patent is extended or adjusted under 35 U.S.C. 154(b) by 52 days.

(21) Appl. No.: 09/709,639

(22) Filed: Nov. 13, 2000

(51) Int. Cl.[7] .................................................. F16L 5/02
(52) U.S. Cl. ........................ 285/202; 285/201; 285/203; 285/204; 285/192; 285/211; 285/139.1; 285/139.2
(58) Field of Search ................................ 285/201, 202, 285/203, 204, 192, 211, 139.2, 136.1

(56) References Cited

U.S. PATENT DOCUMENTS 2,343,440 A * 3/1944 Andrus .................. 204/196.15
3,208,775 A * 9/1965 Stap et al. ................... 285/204

* cited by examiner

Primary Examiner—Lynne H. Browne
Assistant Examiner—Giovanna M. Collins
(74) Attorney, Agent, or Firm—Fei-Fei Chao; Venable

(57) ABSTRACT

A watertight, through wall connector has a tubular body, an O-ring and a holder. A neck is formed on one end of the body has to be bent to hold the holder. With such a connector, the neck is not easily cracked during the pressing process, and the deformation of the body will not occur. This can provide a watertight seal. In addition, the O-ring can fully expand by means of being squeezed between the inside wall of the reservoir and the holder. This can provide a watertight seal due to the full expansion of the O-ring.

3 Claims, 3 Drawing Sheets

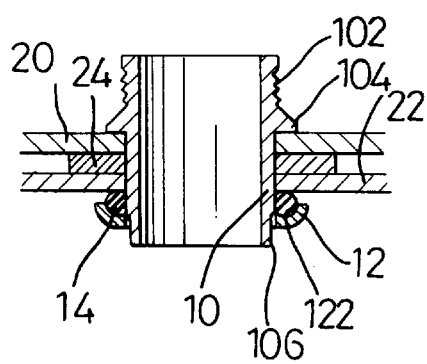
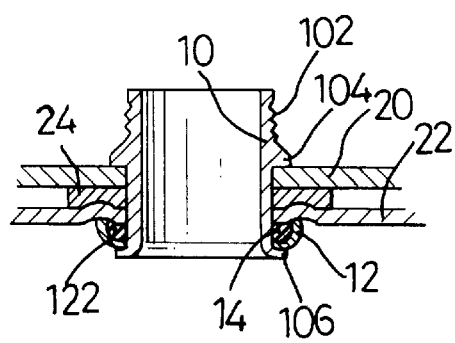
FIG. 2  FIG. 3
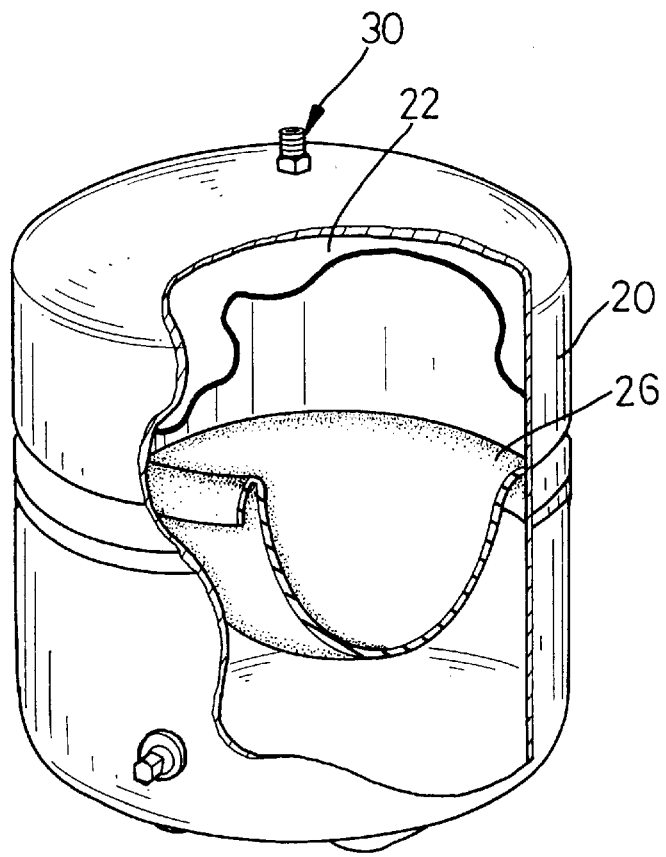
FIG. 4
PRIOR ART

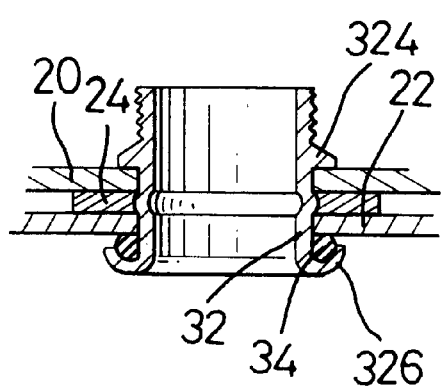
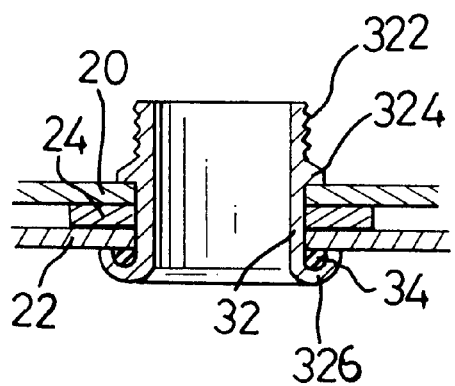
FIG. 7
PRIOR ART
FIG. 5
PRIOR ART
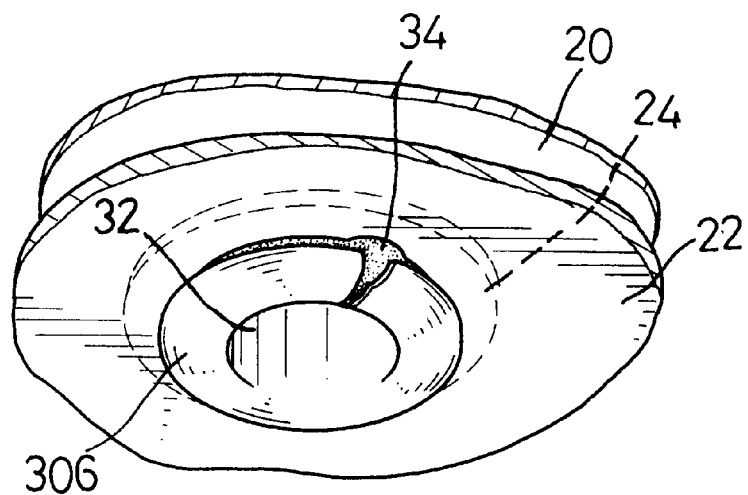
FIG. 6
PRIOR ART

THROUGH WALL CONNECTOR FOR A RESERVOIR

BACKGROUND OF THE INVENTION

1. Field of the Invention

The present invention relates to a connector, and more particularly to a watertight through wall connector for a reservoir.

2. Description of Related Art

With reference to FIGS. 4 and 5, a connector (30) is always mounted on a reservoir to allow the fluid to flow into or out of the reservoir. The conventional connector in accordance with the prior art comprises a tubular body (32) and an O-ring (34) mounted around the body (32). A thread (322) is formed on the end of the body (32) extending out of the reservoir to connect a supply or discharge hose. The other end of the body (32) will be bent into a curled end (326) by a pressing process to hold the O-ring (34) on the body (32). Consequently, the O-ring (34) can provide a watertight seal at the junction between the connector (30) and the reservoir. A shoulder (324) is formed on the body (32) to abut the outside of the reservoir, such that the reservoir can be clamped between the shoulder (324) and the curled end (326) of the body (32).

However, because the body (32) of the conventional connector (30) has a constant diameter and wall thickness and the curled end (326) must be bent to enclose the O-ring (34), a large force is required to curl the curled end (326). the curled end (326) is easily cracked (see FIG. 6) during the pressing process. The O-ring (34) will be exposed through the cracks, such that the integrity of the watertight seal of the connector (30) will be compromised. The cracks also reduce the overall strength of the connector. With reference to FIG. 7, the body (32) is also easily deformed during the pressing process, and the deformation may further compromise the watertight integrity of the body (32). Deformation in the body (32) may cause the curled end (326) not to entirely enclose the O-ring (34). In this case, the watertight integrity of the O-ring (34) will be completely compromised and the connector will fail.

Furthermore, with reference to FIGS. 4 to 7, the reservoir for a drinking water dispenser always has a metal shell (20) and a plastic lining (22). The connector (30) extends through both the shell (20) and the lining (22). A diaphragm (26) is mounted below the lining (22), such that an air cushion is defined between the shell (20) and the diaphragm (26). The air cushion can exert pressure on the water stored in the lining (22) to cause the water to flow out of the connector (30). A gasket (24) is usually mounted around the hole between the shell (20) and the lining (22) to stiffen the metal shell (20) and plastic lining (22) in the area of the hole and to form an airtight seal to block the leakage of air.

However, the diameter of the contact area between the curled end (326) of the conventional connector (30) and the lining (22) is only slightly larger than the diameter of the hole so that a gap will be defined between the lining (22) and the gasket (24), especially when the body (32) is deformed as shown in FIG. 7. The airtight seal of the gasket (24) will fail.

To overcome the shortcomings, the present invention tends to provide an improved connector to mitigate or obviate the aforementioned problems.

SUMMARY OF INVENTION

The main objective of the invention is to provide an improved connector to provide a watertight seal. The connector comprises a tubular body, an O-ring and a holder. A neck is formed on one end of the body to be bent to hold the holder. By such an arrangement, deformation of the body will not occur during the pressing process, and the curled neck is not cracked. The O-ring will be fully pressed by the holder to provide a watertight seal.

Other objects, advantages and novel features of the invention will become more apparent from the following detailed description when taken in conjunction with the accompanying drawings.

BRIEF DESCRIPTION OF THE DRAWINGS

FIG. 2 is a cross sectional side plan view of the connector in FIG. 1 and the reservoir wall showing that the body extends through the shell and the lining of the reservoir;

FIG. 3 is a cross sectional side plan view of the connector in FIG. 1 engaged with the reservoir showing that the neck of the body is curled to hold the holder;

FIG. 4 is a perspective view in partial section of a reservoir with a conventional connector in accordance with the prior art;

FIG. 5 is a cross sectional side plan view of the conventional connector in FIG. 4 and the reservoir wall;

FIG. 6 is a perspective view of the conventional connector in FIG. 4 showing the cracked curled end of the body; and FIG. 7 is a cross sectional side plan view of the conventional connector in FIG. 4 and the reservoir wall showing the deformed body of the connector.

DETAILED DESCRIPTION OF PREFERRED EMBODIMENT

Figure 1:
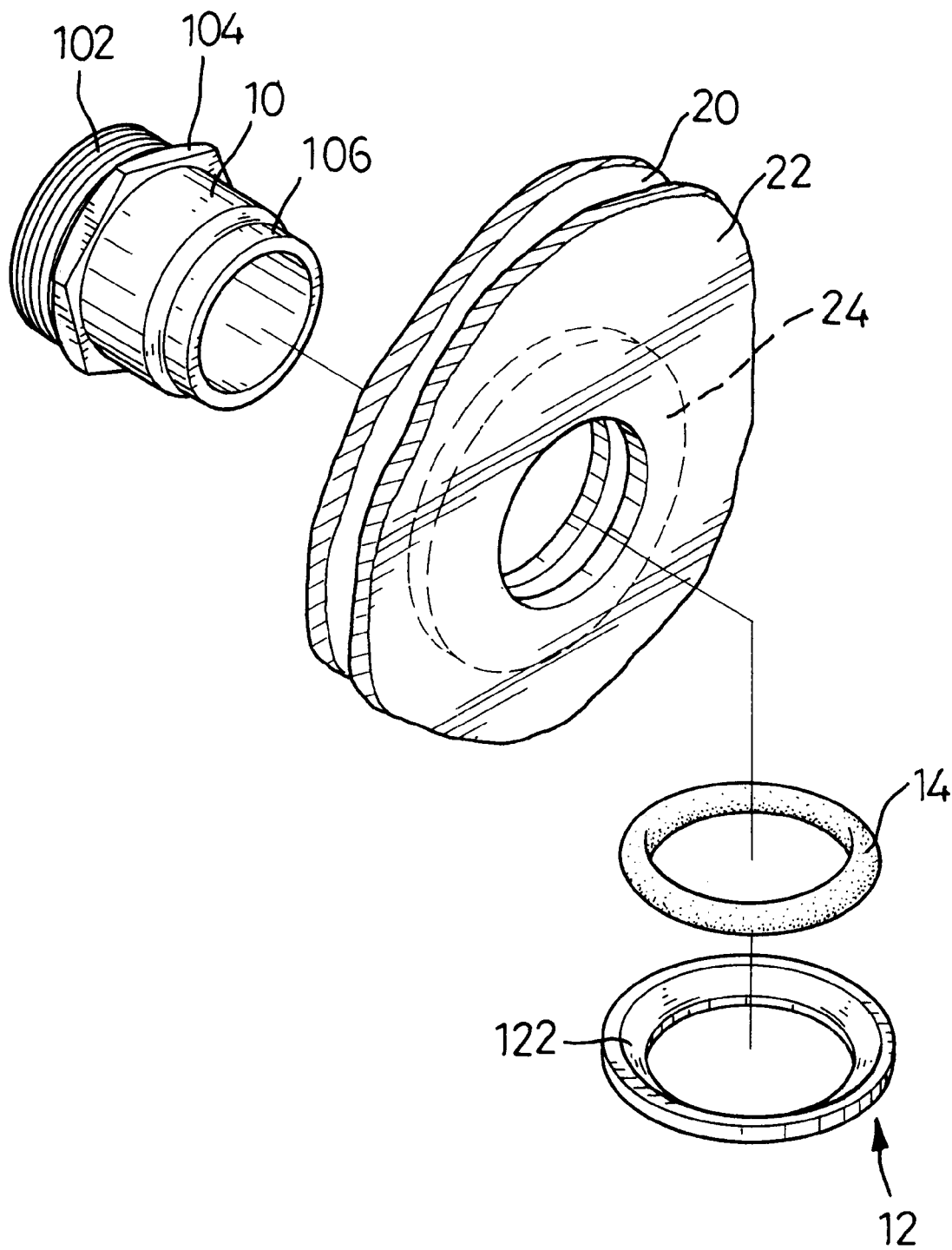
FIG. 1 is an exploded perspective view of a connector in accordance with the present invention and a reservoir wall.

With reference to FIG. 1, a connector in accordance with the present invention comprises a tubular body (10), an O-ring (14) and an annular holder (12). The body (10) extends through the outer shell (20) and the inner lining (22) of a reservoir. A thread (102) is formed on the end of the body (10) that extends out from the reservoir to connect with a hose. In practice, the thread (102) can be an outer thread as shown in FIG. 1 or an inner thread. A neck (106) with an outer diameter smaller than the body (10) is formed on the other end of the body (10). The wall thickness of the neck (106) is thinner than the wall thickness of the body (10). A shoulder (104) is formed at the inside extent of the thread (102) to abut the outer shell (20) of the reservoir wall. A concave annular groove (122) is defined in the holder (12) to receive the O-ring (14). To achieve a watertight seal, the depth of the groove (122) is less than the thickness of the O-ring (14).

With reference to FIGS. 2 and 3, to install the connector in the wall of a reservoir, the end of the body (10) with the neck (106) is first inserted through the hole defined in the outer shell (20), the gasket (24) and the inner lining (22) of the reservoir. The O-ring (14) and the holder (12) are sequentially mounted on the end of the body (10) extending into the reservoir. The neck (106) of the body (10) is then bent to abut the holder (12) by a pressing process. The bent neck (106) will press against the holder (12) to firmly hold the holder (12) in place. The shell (20), the gasket (24) and the lining (22) are tightly clamped between the shoulder (104) of the body (10) and the holder (12). The O-ring (14) will expand as it is squeezed between the holder (12) and the lining of the reservoir. This forms a watertight seal at the junction of the connector and the reservoir lining.

With such a connector assembly, because the thickness of the neck (106) is smaller than the wall thickness of the body (10) and the neck (106) only needs to be bent to press against the holder (12), the neck (106) is not easily cracked during the pressing process. Because less force is required to bend the thinner neck (106), deformation of the body (10) will not occur. Even though some cracks may form in the neck (106), the cracks do not extend into the body (10). Therefore, the integrity of the watertight seal between the reservoir lining and the body (10) of the connector is not jeopardized.

In addition, because the depth of the groove (122) is less than the thickness of the O-ring (14), the O-ring (14) will be deformed to be completely enclosed in the groove (122) in the holder (12) and fully expand against the outside of the body (10) as it is squeezed between the holder (12) and the lining of the reservoir. This provides a very good watertight seal due to the full expansion of the O-ring (14).

Furthermore, the diameter of the contact area between the holder (12) and the lining (22) is larger than that between the curled end (326) of the conventional connector (30) and the lining (22) as shown in FIG. 5. The lining (22) will be squeezed by the holder (12) to fully abut the gasket (24). No gap will occur between the lining (22) and the gasket (24), and leakage is avoided.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A through wall connector for a reservoir having an inner lining, the connector comprising:

a tubular body adapted to extend into the reservoir and having a thread formed on a first end of the body extending out of the reservoir;

an O-ring mounted on the body and adapted to abut an inside wall of the reservoir; and an annular holder mounted on the body and having a concave annular groove defined in the holder to hold the O-ring;

wherein the body has a neck integrally formed on a second end opposite to the first end to be adapted to be bent to hold the holder;

wherein the neck has an outer diameter smaller than that of the body;

the O-ring is deformed to be completely enclosed in the groove in the holder when the neck is bent to hold the holder; and the holder is adapted to deform the inner lining of the reservoir when the neck is bent to hold the holder.

2. The connector as claimed in claim 1, wherein the groove has a depth less than a thickness of the O-ring.

3. The connector as claimed in claim 1, wherein a shoulder is integrally formed on the body to be adapted to abut an outside wall of the reservoir.

* * * * *